(12) United States Patent
Anegawa et al.

(10) Patent No.: US 11,845,215 B2
(45) Date of Patent: Dec. 19, 2023

(54) METHOD FOR MANUFACTURING THREE-DIMENSIONAL SHAPED OBJECT AND THREE-DIMENSIONAL SHAPING DEVICE

(71) Applicant: SEIKO EPSON CORPORATION, Tokyo (JP)

(72) Inventors: Kenta Anegawa, Matsumoto (JP); Daizo Aoyagi, Shiojiri (JP); Yusuke Watanabe, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 414 days.

(21) Appl. No.: 17/018,140

(22) Filed: Sep. 11, 2020

(65) Prior Publication Data

US 2021/0078242 A1    Mar. 18, 2021

(30) Foreign Application Priority Data

Sep. 13, 2019    (JP) .................. 2019-166990

(51) Int. Cl.
*B29C 64/106* (2017.01)
*B29C 64/188* (2017.01)
(Continued)

(52) U.S. Cl.
CPC .......... *B29C 64/106* (2017.08); *B29C 64/188* (2017.08); *B29C 64/209* (2017.08);
(Continued)

(58) Field of Classification Search
CPC ... B29C 64/106; B29C 64/118; B29C 64/188; B29C 64/209; B29C 64/295;
(Continued)

(56) References Cited

U.S. PATENT DOCUMENTS 5,121,329 A * 6/1992 Crump .................. G05B 19/41
228/180.5
5,209,878 A * 5/1993 Smalley ................ B29C 64/393
427/586
(Continued)

FOREIGN PATENT DOCUMENTS

CN    109719935    5/2019
CN    106965421    10/2020
(Continued)

OTHER PUBLICATIONS

Onoki Shigeharu, "Polymer Material Science," May 1983, Beijing Publishing House, Xinhua Bookstore, pp. 338-341.

*Primary Examiner* — Michael A Tolin
(74) *Attorney, Agent, or Firm* — WORKMAN NYDEGGER

(57) ABSTRACT

A method for manufacturing a three-dimensional shaped object includes: a first step of forming a first portion of the three-dimensional shaped object by discharging a shaping material containing a resin from a discharge portion toward a stage or a previously formed layer and pressing the discharged shaping material against a tip end surface of the discharge portion; a heating step of heating the first portion to a temperature less than a glass transition temperature of the resin; and a second step of forming a second portion of the three-dimensional shaped object by discharging the shaping material from the discharge portion toward the first portion heated in the heating step and pressing the discharged shaping material against the tip end surface.

4 Claims, 9 Drawing Sheets

(51) Int. Cl.
  *B29C 64/209* (2017.01)
  *B29C 64/295* (2017.01)
  *B29C 64/393* (2017.01)
  *B33Y 10/00* (2015.01)
  *B33Y 40/20* (2020.01)
  *B33Y 50/02* (2015.01)
  *B33Y 30/00* (2015.01)

(52) U.S. Cl.
  CPC .......... *B29C 64/295* (2017.08); *B29C 64/393* (2017.08); *B33Y 10/00* (2014.12); *B33Y 30/00* (2014.12); *B33Y 40/20* (2020.01); *B33Y 50/02* (2014.12)

(58) Field of Classification Search
  CPC ..... B29C 64/393; B29C 64/10; B29C 64/194; B29C 64/20; B29C 64/205; B29C 64/264; B29C 64/277; B29C 64/282; B33Y 10/00; B33Y 30/00; B33Y 40/20; B33Y 50/02
  See application file for complete search history.

(56) References Cited

U.S. PATENT DOCUMENTS

| | | | |
|---|---|---|---|
| 2014/0048970 A1 | 2/2014 | Batchelder et al. | |
| 2014/0291886 A1* | 10/2014 | Mark | B29C 69/001 |
| | | | 264/259 |
| 2017/0157845 A1 | 6/2017 | Bihari et al. | |
| 2018/0085826 A1* | 3/2018 | Luo | B22F 12/70 |
| 2018/0194076 A1* | 7/2018 | Bell | B29C 64/393 |
| 2019/0030820 A1* | 1/2019 | Saito | B33Y 50/02 |
| 2019/0061241 A1* | 2/2019 | Nadata | B33Y 40/00 |
| 2019/0248069 A1 | 8/2019 | Anegawa et al. | |

FOREIGN PATENT DOCUMENTS

| | | |
|---|---|---|
| JP | 2006-192710 A | 7/2006 |
| JP | 2017-523063 A | 8/2017 |
| JP | 2019-518864 | 7/2019 |
| JP | 2019-136990 | 8/2019 |
| WO | 2017-150186 | 9/2017 |
| WO | 2017-152142 | 9/2017 |
| WO | 2018-162268 | 2/2018 |

* cited by examiner

METHOD FOR MANUFACTURING THREE-DIMENSIONAL SHAPED OBJECT AND THREE-DIMENSIONAL SHAPING DEVICE

The present application is based on, and claims priority from JP Application Serial Number 2019-166990, filed Sep. 13, 2019, the disclosure of which is hereby incorporated by reference herein in its entirety.

BACKGROUND

1. Technical Field

The present disclosure relates to a method for manufacturing a three-dimensional shaped object and a three-dimensional shaping device.

2. Related Art

With respect to a method for manufacturing a three-dimensional shaped object, for example, in a device described in JP-A-2006-192710, a melted thermoplastic material is extruded onto a base from an extrusion nozzle for scanning in accordance with preset shape data, and further the melted material is stacked on the material cured on the base to shape a three-dimensional shaped object.

Generally, strength in a stacking direction of a three-dimensional shaped object shaped by stacking layers is lower than strength of a shaped object shaped by injection molding. This is because adhesion strength between the layers is low, and in the device described in JP-A-2006-192710, the adhesion strength between a previously formed layer and a subsequent layer is increased by dissolving an upper surface of the previously formed layer by a solvent and stacking the subsequent layer thereon. However, in the case of using the solvent, since the cost of the solvent itself, a mechanism for supplying the solvent, a storage space of the solvent, and the like are required, it is desired to increase the adhesion strength between the layers without using the solvent.

SUMMARY

According to one aspect of the present disclosure, a method for manufacturing a three-dimensional shaped object is provided. The method for manufacturing a three-dimensional shaped object includes: a first step of forming a first portion of the three-dimensional shaped object by discharging a shaping material containing a resin from a discharge portion toward a stage or a previously formed layer and pressing the discharged shaping material against a tip end surface of the discharge portion; a heating step of heating the first portion to a temperature less than a glass transition temperature of the resin; and a second step of forming a second portion of the three-dimensional shaped object by discharging the shaping material from the discharge portion toward the first portion heated in the heating step and pressing the discharged shaping material against the tip end surface.

DESCRIPTION OF EXEMPLARY EMBODIMENTS

A. First Embodiment

Figure 1:
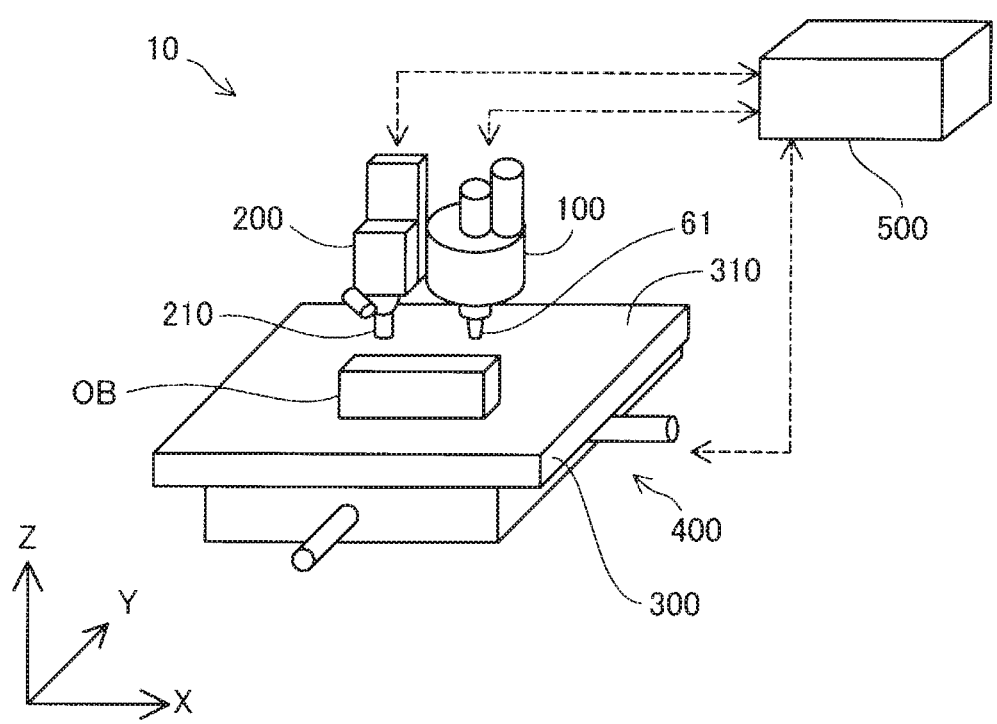
FIG. 1 is a diagram showing a schematic configuration of a three-dimensional shaping device according to a first embodiment.

FIG. 1 is a diagram showing a schematic configuration of a three-dimensional shaping device 10 according to a first embodiment. In FIG. 1, arrows along X, Y, and Z directions which are orthogonal to each other are represented. The X direction and Y direction are directions along a horizontal direction and the Z direction is a direction along a vertical direction. In other figures, the arrows along the X, Y, and Z directions are represented as appropriate. The X, Y, Z directions in FIG. 1 and the X, Y, Z directions in other figures represent the same direction.

The three-dimensional shaping device 10 according to the present embodiment includes a discharge unit 100, a cutting unit 200, a stage 300, a drive unit 400, and a control unit 500. In the three-dimensional shaping device 10, under control of the control unit 500, a shaping material is discharged from a discharge portion 60 provided in the discharge unit 100 to a shaping surface 310 on the stage 300, and meanwhile a relative position between the discharge portion 60 and the stage 300 is changed by driving the drive unit 400, so that the shaping material is stacked on the stage 300. Detailed configurations of the discharge unit 100 and the stage 300 will be described later with reference to FIG. 2.

In the three-dimensional shaping device 10 according to the present embodiment, under control of the control unit 500, a cutting tool 210 attached to the cutting unit 200 is rotated, and meanwhile a relative position between the cutting tool 210 and the stage 300 is changed by driving the drive unit 400, so that the shaping material stacked on the stage 300 is cut. That is, the three-dimensional shaping device 10 creates a three-dimensional shaped object OB having a desired shape by stacking the shaping material and cutting the shaping material. In FIG. 1, the three-dimensional shaped object OB is schematically illustrated.

The cutting unit 200 is a cutting device that rotates the cutting tool 210 attached to a shaft of a head tip end to cut the shaping material stacked on the stage 300. As the cutting tool 210, for example, a flat end mill or a ball end mill can be used. The cutting unit 200 detects a position of a tip end of the cutting tool 210 by a general position detection sensor, and transmits a detection result to the control unit 500. The control unit 500 controls a relative positional relationship between the cutting tool 210 and the stacked shaping material by the drive unit 400 to be described later using the detection result, so as to perform cutting. The cutting unit 200 may include a static eliminator such as an ionizer.

The drive unit 400 changes a relative position between the discharge unit 100 and the cutting unit 200, and the stage 300. In the present embodiment, the drive unit 400 moves the stage 300 with respect to the discharge unit 100 and the cutting unit 200. A change in a relative position of the nozzle 61 with respect to the shaping surface 310 may be referred to as movement of the nozzle 61. A direction of the change in the relative position of the nozzle 61 with respect to the shaping surface 310 may be referred to as a moving direction of the nozzle 61. In the present embodiment, for example, moving the stage 300 in a +X direction can also be said as moving the nozzle 61 in a −X direction. At this time, the moving direction of the nozzle 61 is the −X direction.

The drive unit 400 according to the present embodiment is implemented by a three-axis positioner that moves the stage 300 in three axial directions of the X, Y, and Z directions by drive forces of three motors. Each motor is driven under the control of the control unit 500. The drive unit 400 may be configured not to move the stage 300 but to move the discharge unit 100 and the cutting unit 200 without moving the stage 300. The drive unit 400 may be configured to move the discharge unit 100 and the cutting unit 200, and the stage 300.

The control unit 500 is implemented by a computer including one or more processors, a main storage device, and an input and output interface for inputting and outputting signals from and to the outside. In the present embodiment, the control unit 500 performs various functions by executing a program or an instruction read on the main storage device by the processor. The control unit 500 may be configured by a combination of a plurality of circuits instead of the computer.

Figure 2:
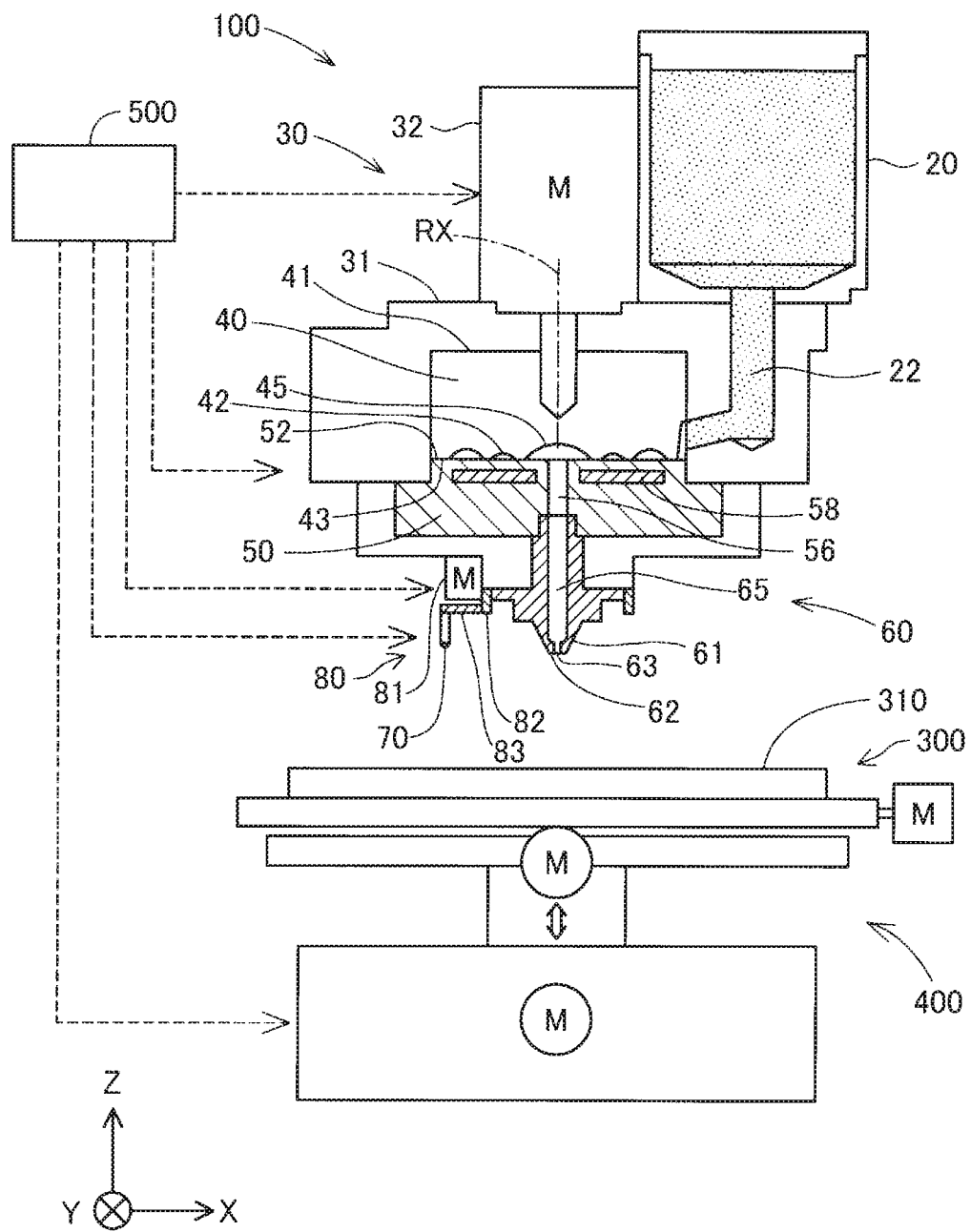
FIG. 2 is a diagram showing a schematic configuration of a discharge unit according to the first embodiment.

FIG. 2 is a diagram showing a schematic configuration of the discharge unit 100 according to the present embodiment. The discharge unit 100 includes a material supply unit 20, a melting unit 30, a discharge portion 60, and a heating unit 70. The material supply unit 20 is fed with a material in a state of pellets, powder, or the like. The material in the present embodiment is an ABS resin in a pellet form. The material supply unit 20 in the present embodiment is implemented by a hopper. The material supply unit 20 and the melting unit 30 are coupled by a communication path 22 provided below the material supply unit 20. The material fed to the material supply unit 20 is supplied to the melting unit 30 via the communication path 22.

The melting unit 30 includes a screw case 31, a drive motor 32, a flat screw 40, and a barrel 50. The melting unit 30 melts at least a part of the material in a solid state supplied from the material supply unit 20 to prepare the shaping material in a paste form having fluidity, and then supplies the shaping material to the nozzle 61. The term "melt" not only means that a material having thermoplasticity is heated to a temperature equal to or higher than a melting point to become a liquid, but also means "plasticization" in which the material having thermoplasticity is softened by being heated to a temperature equal to or higher than a glass transition point, and exhibits fluidity. The flat screw 40 is sometimes simply referred to as a screw.

The flat screw 40 is accommodated in the screw case 31. The drive motor 32 is fixed to an upper surface of the screw case 31. A rotation shaft of the drive motor 32 is coupled to an upper surface 41 of the flat screw 40.

The flat screw 40 has a substantially columnar shape whose height in a direction along a central axis RX is smaller than a diameter of the flat screw 40. The flat screw 40 is disposed in the screw case 31 such that the central axis RX is parallel to the Z direction. The flat screw 40 rotates around the central axis RX in the screw case 31 due to a torque generated by rotation of the drive motor 32.

The flat screw 40 includes a groove forming surface 48 on a side opposite to the upper surface 41 in the direction along the central axis RX. A groove portion 42 is formed in the groove forming surface 48. A detailed shape of the groove forming surface 48 of the flat screw 40 will be described below with reference to FIG. 3.

The barrel 50 is provided below the flat screw 40. The barrel 50 includes a screw facing surface 52 that faces the groove forming surface 48 of the flat screw 40. The barrel 50 is incorporated with a heater 58 at a position facing the groove portion 42 of the flat screw 40. A temperature of the heater 58 is controlled by the control unit 500.

A communication hole 56 is provided at a center of the screw facing surface 52. The communication hole 56 is in communication with the nozzle 61. A detailed shape of the screw facing surface 52 of the barrel 50 will be described below with reference to FIG. 4.

The discharge portion 60 includes the nozzle 61. The nozzle 61 is provided with a nozzle flow path 65 and a discharge port 63. The nozzle flow path 65 is in communication with the communication hole 56 of the melting unit 30. The discharge port 63 is an opening portion provided in a tip end surface 62 of the nozzle 61, and is provided at one end of the nozzle flow path 65 which is not coupled to the communication hole 56. The tip end surface 62 is a surface of the nozzle 61 constituting a tip end portion protruding toward the shaping surface 310. The shaping material supplied from the melting unit 30 to the nozzle 61 is discharged from the discharge port 63. In the present embodiment, the tip end surface 62 has a substantially circular shape having a diameter Dt, and the discharge port 63 has a substantially circular shape having an opening diameter Dn. A shape of the tip end surface 62 and the discharge port 63 is not limited to the substantially circular shape, and may be, for example, a square or a polygon other than a square. The tip end surface 62 and the discharge port 63 may have different shapes.

The heating unit 70 heats the shaping material stacked on the stage 300. In the present embodiment, the heating unit 70 is implemented by an infrared heater that emits infrared rays toward the shaping surface 310. Output of the heating unit 70 is controlled by the control unit 500.

The heating unit 70 is supported by a rotation mechanism 80, and is rotated by the rotation mechanism 80 to change a position. The rotation mechanism 80 includes a rotation drive unit 81, a rotation unit 82, and a support unit 83. The rotation drive unit 81 includes a stepping motor provided adjacent to the discharge portion 60, and is controlled by the control unit 500. The rotation unit 82 is a substantially cylindrical member having an annular gear surrounding a side surface of the discharge portion 60, and receives a torque of the rotation drive unit 81 to rotate. The support unit 83 has a rod shape, and one end thereof is fixed to the rotation unit 82 and is disposed along the horizontal direction. The heating unit 70 is fixed to the other end of the support unit 83 that is not fixed to the rotation drive unit 81.

Figure 3:
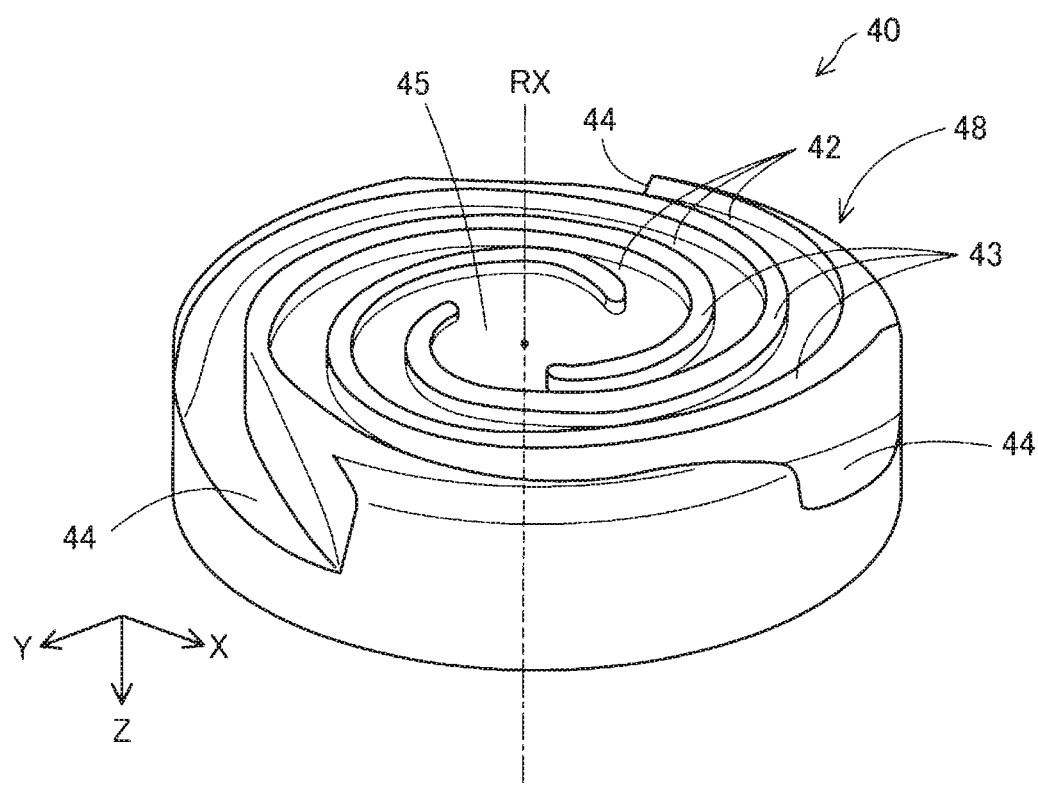
FIG. 3 is a schematic perspective view showing a configuration of a lower surface side of a flat screw.

FIG. 3 is a schematic perspective view showing a configuration of a lower surface side of the flat screw 40. In FIG. 3, a position of the central axis RX of the flat screw 40 is shown by a dashed line. The groove portion 42 is provided on a lower surface of the flat screw 40 facing the barrel 50. Hereinafter, the lower surface of the flat screw 40 will be referred to as the "groove forming surface 48".

A central portion 45 of the groove forming surface 48 of the flat screw 40 is implemented as a recess to which one end of the groove portion 42 is coupled. The central portion 45 faces the communication hole 56 of the barrel 50. In the first embodiment, the central portion 45 intersects the central axis RX.

The groove portion 42 of the flat screw 40 forms a so-called scroll groove. The groove portion 42 extends from the central portion 45 toward an outer periphery of the flat screw 40 in a form of swirl so as to draw an arc. The groove portion 42 may extend spirally. The groove forming surface 48 is provided with ridge portions 43 that form side wall portions of respective groove portions 42 and extend along respective groove portions 42.

The groove portion 42 is continuous to a material inflow port 44 formed in a side surface of the flat screw 40. The material inflow port 44 is a portion that receives the material supplied from the material supply unit 20 via the communication path 22.

FIG. 3 shows an example of the flat screw 40 having three groove portions 42 and three ridge portions 43. The number of the groove portions 42 or the ridge portions 43 provided in the flat screw 40 is not limited to three. The flat screw 40 may be provided with only one groove portion 42, or may be provided with two or more groove portions 42. Any number of the ridge portions 43 may be provided in accordance with the number of the groove portions 42.

FIG. 3 shows an example of the flat screw 40 in which material inflow ports 44 are formed at three places. The number of the material inflow ports 44 provided in the flat screw 40 is not limited to three. In the flat screw 40, the material inflow port 44 may be provided at only one place, or may be provided at two or more places.

Figure 4:
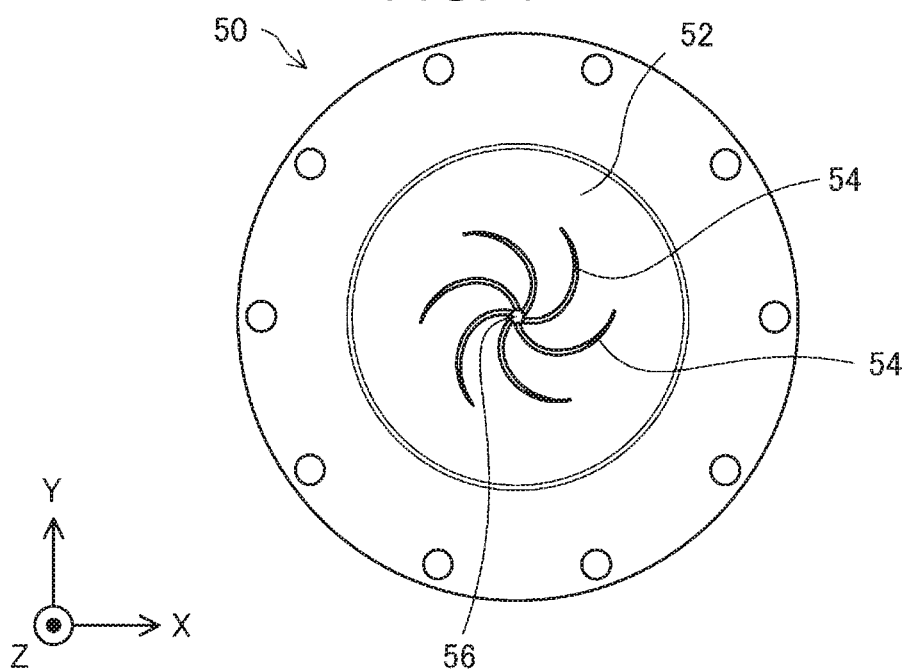
FIG. 4 is a schematic plan view showing a configuration of an upper surface side of a barrel.

FIG. 4 is a schematic plan view showing a configuration of an upper surface side of the barrel 50. An upper surface of the barrel 50 faces the groove forming surface 48 of the flat screw 40 as described above. Hereinafter, the upper surface of the barrel 50 is referred to as a "screw facing surface 52". The screw facing surface has a substantially circular shape. The communication hole 56 for supplying the shaping material to the nozzle 61 is formed at a center of the screw facing surface 52.

A plurality of guide grooves 54 that are coupled to the communication hole 56 and extend in the form of swirl from the communication hole 56 towards an outer periphery are formed on the screw facing surface 52. The plurality of guide grooves 54 have a function of guiding the shaping material flowing into the central portion 45 of the flat screw 40 to the communication hole 56.

When the flat screw 40 rotates, the material supplied from the material inflow port 44 is guided to the groove portion 42 to move toward the central portion 45 while being heated in the groove portion 42. As the central portion 45 is closer to the material, the material is more melted and has increased fluidity, and is converted into the shaping material. The shaping material concentrated in the central portion 45 flows out from the communication hole 56 to the nozzle 61 due to an internal pressure generated in the central portion 45.

Figure 5:
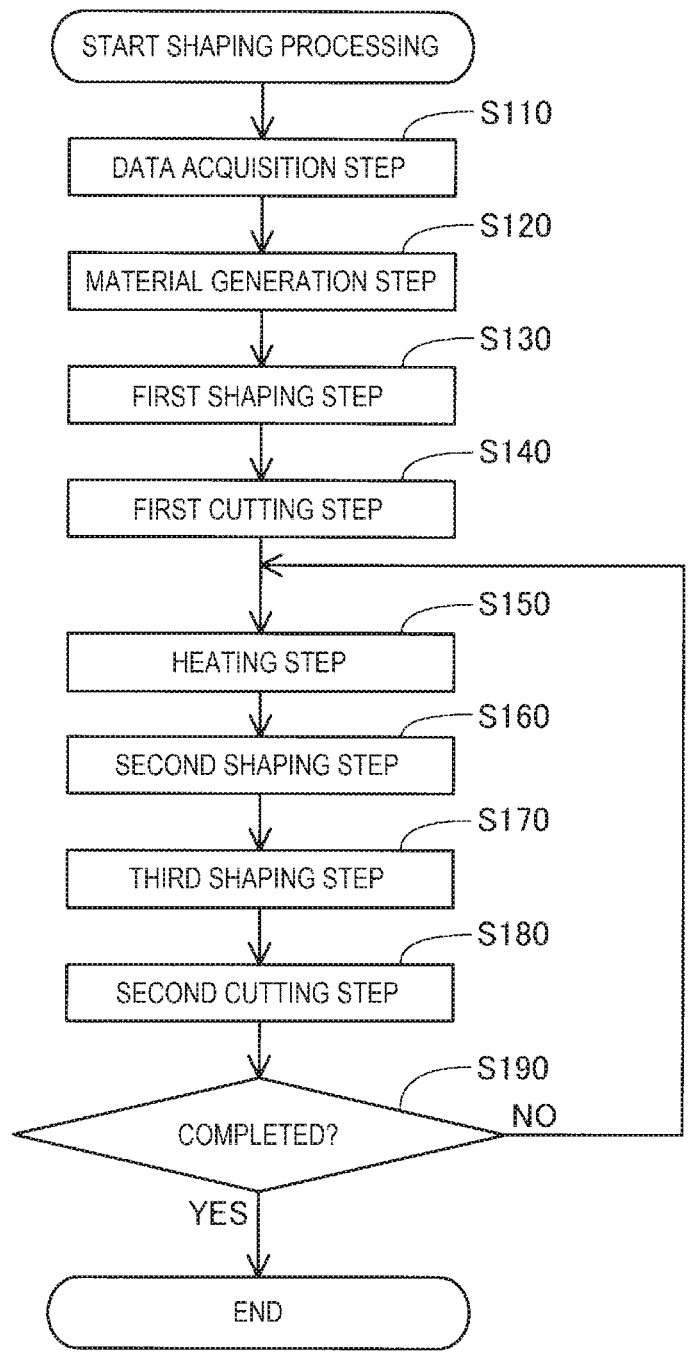
FIG. 5 is a process diagram of a shaping processing of a three-dimensional shaped object according to the first embodiment.

FIG. 5 is a process diagram of a shaping processing of the three-dimensional shaped object OB according to the first embodiment. The control unit 500 executes a shaping program for creating the three-dimensional shaped object OB to shape the three-dimensional shaped object OB.

In a data acquisition step of step S110, the control unit 500 acquires shaping data and cutting data. The shaping data is data representing a shaping path that is a scanning path of the nozzle 61 that moves while discharging the shaping material with respect to the stage 300. The shaping data represents, in addition to the shaping path, a target value of a discharge amount, which is a flow rate of the shaping material discharged from the nozzle 61, a target value of a rotation speed of the drive motor 32 for rotating the flat screw 40, a target value of a temperature of the heater 58 of the barrel 50, and the like. The cutting data is data representing a cutting path which is a scanning path of the cutting tool 210 that moves while cutting the shaped shaping material with respect to the stage 300. Cutting path data represents, in addition to the cutting path, a target value of a rotation speed of the cutting tool 210, a target value of a feed speed of the cutting tool 210, and the like. The control unit 500 may generate shaping path data and the cutting path data based on three-dimensional shape data of the shaped object to be created. In this case, the three-dimensional shaping device 10 may include a computer or the like separately from the control unit 500 that generates the shaping path data and the cutting path data.

In a material generation step of step S120, the control unit 500 controls the rotation of the flat screw 40 and output of the heater 58 incorporated in the barrel 50 to melt the material to generate the shaping material. Even while steps after step S130 are executed, the shaping material is continuously generated by the melting unit 30.

In a first shaping step of step S130, the control unit 500 shapes a first portion 800 of the three-dimensional shaped object OB. In the present embodiment, the first portion 800 refers to a first layer. The first layer is a single layer or a plurality of layers formed by stacking the shaping material on the shaping surface 310 or an existing layer. In the present embodiment, the first layer is shaped on the shaping surface 310. The existing layer refers to a layer that is already formed before executing the shaping processing by stacking the shaping material discharged from the nozzle 61. The step of shaping the first layer in step S130 is sometimes referred to as a first step.

Figure 6:
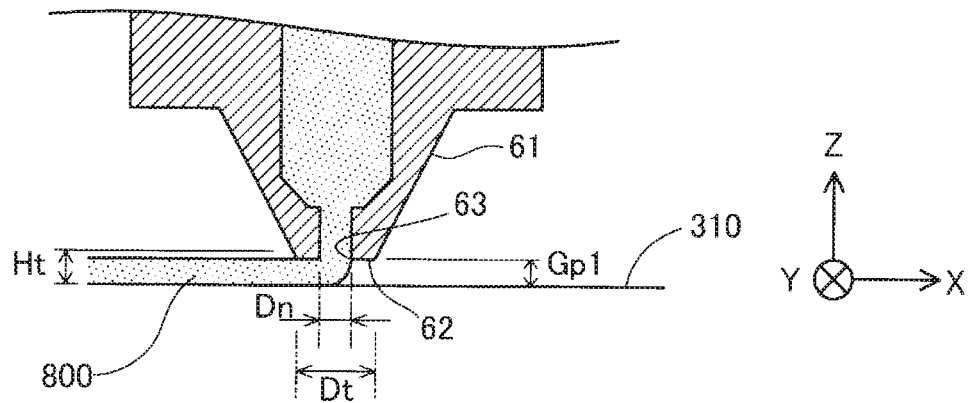
FIG. 6 is a diagram showing a shaping step of a first portion.

FIG. 6 is a diagram showing a shaping step of the first portion 800 in step S130. FIG. 6 shows a state during the first portion 800 being shaped on the shaping surface 310. In step S130, the control unit 500 controls the drive unit 400 to move the nozzle 61 while the shaping material is discharged from the nozzle 61, and press the discharged shaping material against the tip end surface 62 of the discharge portion 60 to shape the first layer. The term "press" refers to making a distance Gp between the tip end surface 62 and an upper surface of a shaping region in which the shaping material is discharged to be smaller than a height Ht of the discharged shaping material while the shaping material is discharged from the nozzle 61. In FIG. 6, the shaping region is a part of an upper surface of the shaping surface 310, and a distance Gp1 between the tip end surface 62 and the shaping surface 310 is made smaller than the height Ht. The height Ht is a height of the shaping material when the shaping material is discharged without being pressed by the tip end surface 62, and is approximately equal to the opening diameter Dn in the present embodiment. That is, making the distance Gp smaller than the opening diameter Dn can also be referred to as "press". When the first layer is shaped on the existing layer, the distance Gp is a distance between the tip end surface 62 and an upper surface of the existing layer.

The control unit 500 can adjust a degree of pressing the shaping material against the tip end surface 62 by controlling the drive unit 400 to adjust the distance Gp when the shaping material is discharged from the nozzle 61. The "degree of pressing" may be referred to as a collapsing amount. The collapsing amount increases as the distance Gp decreases. A collapsing amount in the first shaping step may be referred to as a first collapsing amount. Details of the collapsing amount will be described later.

Referring to FIG. 5, in a first cutting step of step S140, the control unit 500 controls the cutting unit 200 to perform the first cutting step of cutting the first layer shaped in step S130. In the present embodiment, a side surface of the first layer, which is a part of the first layer, is cut. Before the first cutting step, a step of cooling the first layer may be executed. In the present embodiment, the first layer is cooled and solidified over time. When it is not necessary to cut the first layer, the first cutting step may be omitted.

In a heating step of step S150, the control unit 500 controls the heating unit 70 to heat the first layer. This heating step is performed in parallel during the shaping of the second portion in step S160, which will be described later. In the present embodiment, the control unit 500 controls the rotation mechanism 80 to position the heating unit 70 in front of the nozzle 61 in the moving direction while infrared rays are emitted from the heating unit 70 toward the first layer, so that the first layer is heated. The heating of the first layer also includes heating a part of the first layer.

In step S150, the first layer is heated to a temperature of 80% or more in the Celsius temperature scale of a glass transition point Tg of a resin contained in the shaping material constituting the first layer and less than the glass transition point Tg. The details of the temperature at which the first layer is heated in the heating step will be described later. The glass transition point is sometimes referred to as a glass transition temperature.

In a second shaping step of step S160, the control unit 500 shapes a second portion 810 of the three-dimensional shaped object OB. The second portion 810 refers to a bottom layer of a second layer. The second layer is a single layer or a plurality of layers formed by stacking the shaping material on the single layer shaped until step S150. That is, the second portion 810 is a single layer formed immediately above the first layer and in contact with the first layer. The second portion 810 may be shaped on a part of the first layer. The second shaping step may be referred to as a second step.

Figure 7:
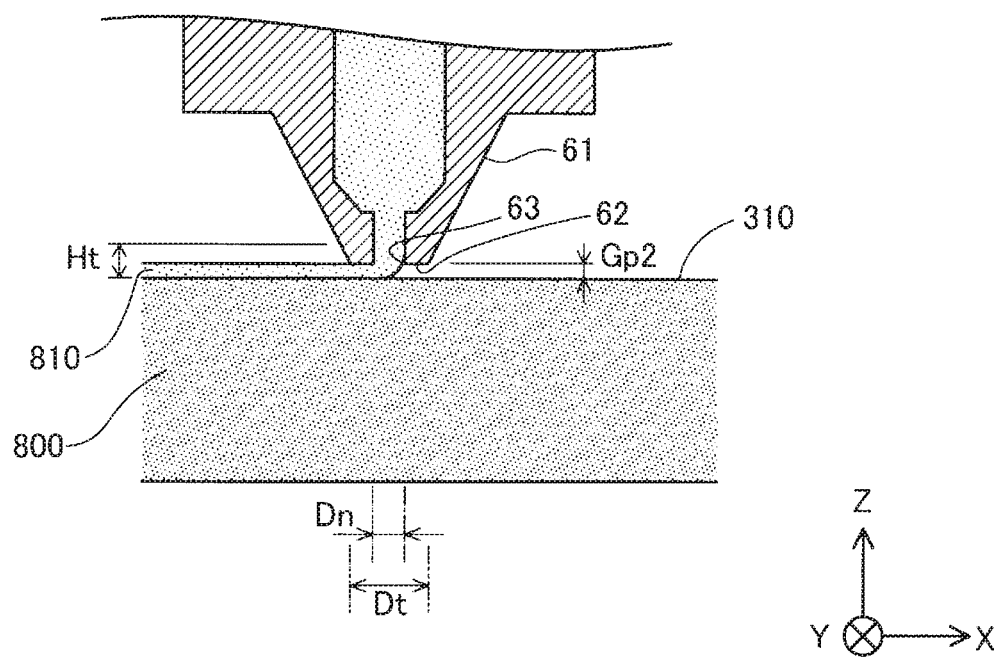
FIG. 7 is a diagram showing a shaping step of a second portion.

FIG. 7 is a diagram showing a shaping step of the second portion in step S160. FIG. 7 shows a state during the second portion 810 being shaped on an upper surface of the first portion 800. In step S160, the control unit 500 controls the heating unit 70 and the drive unit 400 to heat the first layer by the heating unit 70 positioned in front of the nozzle 61 in the moving direction, and the second portion 810 is shaped by discharging the shaping material from the nozzle 61 positioned behind the heating unit 70 in the moving direction while the discharged shaping material is pressed against the tip end surface 62. In the shaping step of the second portion 810, the collapsing amount is increased compared with that in the shaping step of the first portion 800. That is, a distance Gp2 between the tip end surface 62 and the upper surface of the first portion 800 is smaller than the distance Gp1. A collapsing amount in the second shaping step may be referred to as a second collapsing amount.

Referring to FIG. 5, in a third shaping step of step S170, the control unit 500 shapes a third portion of the three-dimensional shaped object OB. The third portion is a single layer or a plurality of layers above the second portion 810 of the second layer. In step S130, the control unit 500 controls the drive unit 400 to move the nozzle 61 while the shaping material is discharged from the nozzle 61, and press the discharged shaping material against the tip end surface 62 of the discharge portion 60 to shape the third portion. In the present embodiment, a third collapsing amount in the third shaping step is the same as the first collapsing amount. The third collapsing amount may be different from the first collapsing amount. For example, the third collapsing amount may be the same as the second collapsing amount. When the second layer is formed only by the second portion 810, step S170 may be omitted.

In a second cutting step of step S180, the control unit 500 controls the cutting unit 200 to perform the second cutting step of cutting the second layer shaped in steps S160 and S170. In the present embodiment, a side surface of the second layer in a stacking direction, which is a part of the second layer, is cut. Before the second cutting step, a step of cooling the second layer may be executed. In the present embodiment, the second layer is cooled and solidified over time. When it is not necessary to cut the second layer, the step S180 may be omitted.

In step S190, the control unit 500 determines whether the three-dimensional shaped object OB is completed. When the three-dimensional shaped object OB is completed, the control unit 500 ends the shaping program. When the three-dimensional shaped object OB is not completed, the control unit 500 repeatedly executes steps S150 to S180 for shaping an upper layer above the second layer, and completes the three-dimensional shaped object OB.

While the shaping material is discharged from the nozzle 61 in the shaping processing shown in FIG. 5, the control unit 500 controls the drive unit 400 to adjust the distance Gp so as to satisfy the following Formula (1).

$$(Sq \times Gp)/Vt > 1.0 \qquad (1)$$

Here, the area Sq indicates an area of the tip end surface 62, and the volume Vt indicates a volume of the shaping material discharged from the nozzle 61 for each unit movement amount of the nozzle 61. When the above Formula (1) is satisfied, the volume Vt is larger than a volume of a substantially columnar space formed between the tip end surface 62 and the shaping region. Therefore, the shaping material discharged from the nozzle 61 does not protrude from the tip end surface 62 in the horizontal direction. That is, in the present embodiment, the three-dimensional shaped object OB is shaped while maintaining a state where the shaping material discharged from the nozzle 61 is pressed by the tip end surface 62 and the pressed shaping material does not protrude from the tip end surface 62 in the horizontal direction. The area Sq is calculated based on the diameter Dt of the tip end surface 62. The volume Vt is calculated based on, for example, the height Ht of the shaping material and an opening area of the discharge port 63. The opening area of the discharge port 63 is calculated based on the opening diameter Dn of the discharge port 63.

Figure 8:
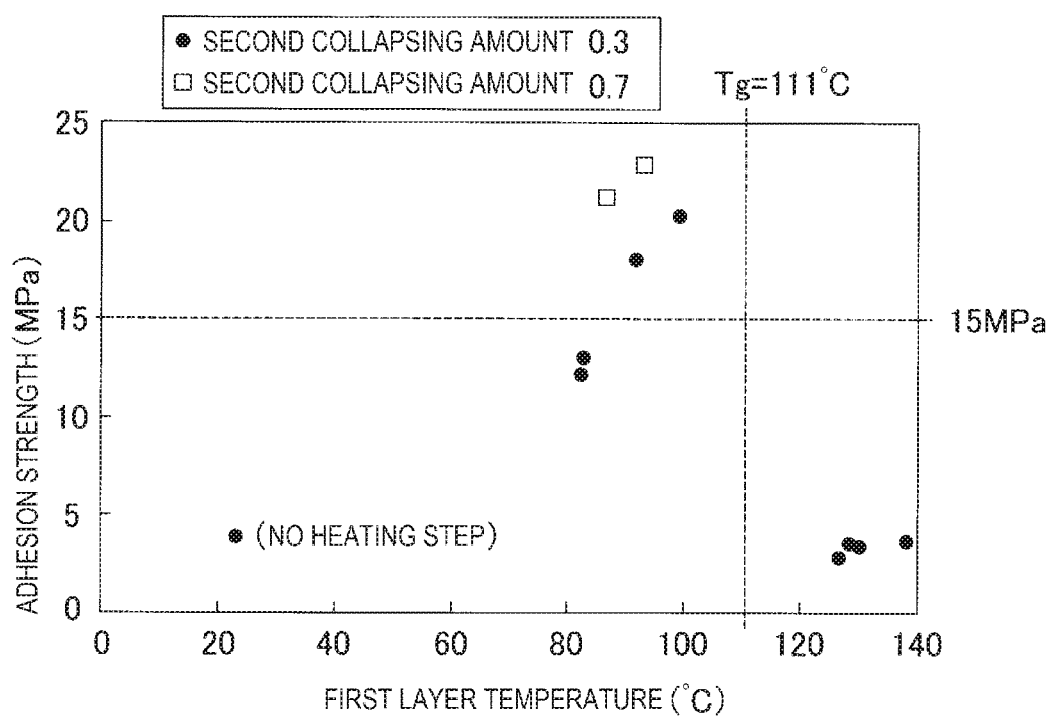
FIG. 8 is a graph in which a vertical axis indicates adhesion strength, and a horizontal axis indicates a first layer temperature.

FIG. 8 is a graph in which a vertical axis indicates adhesion strength between the first portion 800 and the second portion 810, and a horizontal axis indicates a first layer temperature. Data in FIG. 8 is obtained by performing a tensile test on a sample created by the three-dimensional shaping device 10.

In order to obtain the data of FIG. 8, first, a sample was created using an ABS resin in a pellet form as the material. Specifically, by executing the shaping processing shown in FIG. 5, a layer obtained by stacking five layers of a substantially rectangular single layer of 10 mm×4 mm was created as the first layer, and further, a layer obtained by stacking five layers of a substantially rectangular single layer of 10 mm×4 mm on the first layer was created as the second layer. A height of the sample was 49 mm. The substantially rectangular single layer was created by repeating an operation of moving the nozzle 61 in a +Y direction by 1 mm after moving the nozzle 61 along the X direction by 10 mm while discharging the shaping material heated to 230° C. by the heater 58 from the nozzle 61 having an opening diameter of 1 mm. That is, the nozzle 61 was moved by 3 mm in the +Y direction while reciprocating twice along the X direction. In the heating step of step S150, a plurality of samples having different heating temperatures was created by changing the temperature at which the first layer was heated. The first layer temperature is a temperature of the first layer after being heated in the heating step of step S150 and before the second portion is formed in the second shaping step of step S160. When the sample is created, the first cutting step of step S140 and the second cutting step of step S180 shown in FIG. 5 are omitted.

In addition, samples having different second collapsing amounts were also created. When the collapsing amount is P, the collapsing amount P is expressed by the following Formula (2).

$$P=(Dn-Gp)/Dn \quad (2)$$

For example, when the opening diameter Dn is 1 mm and the distance Gp is 0.7 mm, the collapsing amount P is 0.3. Two kinds of samples having the second collapsing amount of 0.3 and 0.7 were created this time. The first collapsing amount and the third collapsing amount were the same for all samples, which were 0.3.

Both ends of the created sample in the stacking direction were gripped by a jig disposed with a distance of 3 mm, and pulled at a speed of 2 mm/min along the stacking direction until the sample was broken to perform a tensile test. In the tensile test, breakage occurred between the first layer and the second layer in all the samples. The adhesion strength between the first portion 800 and the second portion 810 shown in FIG. 8 refers to a tensile stress applied to the sample when the sample was broken in the tensile test.

Referring to FIG. 8, relationships between the adhesion strength and the first layer temperature were different with 111° C. as a threshold value which is the glass transition point Tg of the ABS resin. That is, in the sample having the first layer temperature less than the glass transition point Tg, the adhesion strength was improved as the first layer temperature was increased. In contrast, when the first layer temperature was equal to or larger than the glass transition point Tg, the adhesion strength was not improved even though the first layer temperature was increased. When the first layer temperature was less than the glass transition point Tg, a sample having a large collapsing amount in shaping the second portion 810 exhibited greater adhesion strength than a sample having a small second collapsing amount. The glass transition point Tg was measured using a flow tester. For example, if the glass transition point of the material used for shaping is known, the known value may be used as the glass transition point.

From the above results, it is desirable to heat the first portion 800 to a temperature of 80% or more of the glass transition point in the heating step in order to obtain adhesion strength of 15 MPa or more. The value 15 MPa is a strength with which separation between layers does not generate due to contraction of the three-dimensional shaped object OB during or after the shaping of the three-dimensional shaped object OB. The contraction of the three-dimensional shaped object OB is generated by contraction of the whole or a part of the three-dimensional shaped object OB shaped by stacking the heated shaping material when the three-dimensional shaped object OB is cooled and solidified over time.

In a case where the second layer is shaped on the first layer, when the adhesion strength between the first layer and the second portion 810 is smaller than stress generated by contraction of the second layer, the first layer and the second portion 810 are separated. The stress generated by the contraction of the second layer is proportional to a volume contraction amount of the second layer. The volume contraction amount of the second layer is proportional to a volume of the second layer. Therefore, even if the volume of the second layer is determined as a value at which stress generated by the contraction of the second layer becomes smaller than the adhesion strength between the first layer and the second portion 810, separation between the layers cannot be generated by contraction of the three-dimensional shaped object OB. For example, the case where the third layer is shaped on the second layer is similar to the case where the second layer is shaped on the first layer.

According to a method for manufacturing the three-dimensional shaped object OB of the present embodiment described above, in the first step, the shaping material is pressed against the tip end surface 62 of the nozzle 61 while the shaping material is discharged from the nozzle 61 to shape the first portion 800, and in the second step, the shaping material is pressed against the tip end surface 62 of the nozzle 61 while the shaping material is discharged toward the heated first portion 800 to shape the second portion 810. Therefore, the adhesion strength between the single layers constituting the first portion 800 and the adhesion strength between the first portion 800 and the second portion 810 can be increased without using a solvent, and the strength of the three-dimensional shaped object OB in the stacking direction can be increased.

In the present embodiment, the cutting step of cutting the first portion formed in the first step is provided before the heating step. Therefore, even when the second portion 810 is shaped on the first portion 800 after the first portion 800 is cut, the adhesion strength between the first portion 800 and the second portion 810 can be increased.

In the present embodiment, the second collapsing amount is larger than the first collapsing amount. Thus, this increases adhesion between the first portion 800 and the second portion 810 when shaping the second portion 810 on the first portion 800. Therefore, the adhesion strength between the first portion 800 and the second portion 810 can be increased.

In the present embodiment, the first portion is heated to a temperature of 80% or more of the glass transition temperature Tg and less than the glass transition temperature Tg. Therefore, the adhesion strength between the first portion 800 and the second portion 810 can be more effectively increased.

In the present embodiment, in the heating step, the first portion 800 is heated by the heating unit 70 positioned in front of the nozzle 61 in the moving direction and moving together with the nozzle 61 in the moving direction, and in the second step, the second portion 810 is formed on the first portion 800 heated by the heating unit 70 by the nozzle 61 positioned behind the heating unit 70 in the moving direction. Therefore, it is possible to prevent the influence of a thermal effect on the first portion 800 other than the portion on which the second portion 810 is formed, and to increase the strength of the three-dimensional shaped object OB.

In the present embodiment, a three-dimensional shaped object is shaped so as to satisfy Formula (1). Thus, the shaping material discharged from the nozzle 61 during the shaping can be prevented from protruding from the tip end surface 62 of the nozzle 61 in the horizontal direction. Therefore, the shaping accuracy of the three-dimensional shaped object can be improved.

Here, a material of the three-dimensional shaped object used in the discharge unit 100 described above will be described. The discharge unit 100 can use various materials such as a material having thermoplasticity, a metal material, and a ceramic material as a main material to shape the three-dimensional shaped object. Here, the "main material" means a central material for forming a shape of the three-dimensional shaped object, and a material occupying a content of 50% by weight or more in the three-dimensional shaped object. The above shaping materials include those in which main materials are melted alone, and those in which some of the contained components are melted together with the main material to form a paste.

When the material having thermoplasticity is used as the main material, the shaping material is generated by plasticizing the material in the melting unit 30.

For example, the following thermoplastic resin materials can be used as the material having thermoplasticity.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyetheretherketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone An additive such as a wax, a flame retardant, an antioxidant, and a heat stabilizer in addition to a pigment, a metal, and a ceramic may be mixed to the material having thermoplasticity. The material having thermoplasticity is plasticized by the rotation of the flat screw 40 and the heating of the heater 58 and is then converted into a melted state in the melting unit 30. After the shaping material generated by melting the material having thermoplasticity is discharged from the nozzle 61, the shaping material is cured due to a reduction in temperature.

It is desirable that the material having thermoplasticity is injected from the nozzle 61 in which the material is heated to a temperature equal to or higher than a glass transition point thereof and is then in a completely melted state. For example, when the ABS resin is used, it is desirable that the temperature is about 200° C. when the ABS resin is discharged from the nozzle 61.

In the discharge unit 100, for example, the following metal material may be used as the main material instead of the above material having thermoplasticity. In this case, it is desirable that a component to be melted at the time of generating the shaping material is mixed with a powder material obtained by converting the following metal material into powder, and then the mixture is fed into the melting unit 30 as a material MR.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy In the discharge unit 100, a ceramic material can be used as the main material instead of the above metal material. As the ceramic material, for example, oxide ceramics such as silicon dioxide, titanium dioxide, aluminum oxide, and zirconium oxide, and non-oxide ceramics such as aluminum nitride can be used. When a metal material or a ceramic material as described above is used as the main material, the shaping material discharged onto the shaping surface 310 may be cured by sintering.

The powder material of the metal material or the ceramic material charged into the material supply unit 20 as the material MR may be a mixed material obtained by mixing a plurality of types of powder including single metal powder, alloy powder, and ceramic material powder. The powder material of the metal material or the ceramic material may be coated with, for example, the thermoplastic resin shown above or another thermoplastic resin. In this case, the thermoplastic resin may be melted in the melting unit 30 to exhibit fluidity.

For example, the following solvents can be added to the powder material of the metal material or the ceramic material charged into the material supply unit 20 as the material MR. A solvent can be used alone or in combination of two or more types selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged to the material supply unit 20 as the material MR.

Example of Binder

Figure 9:
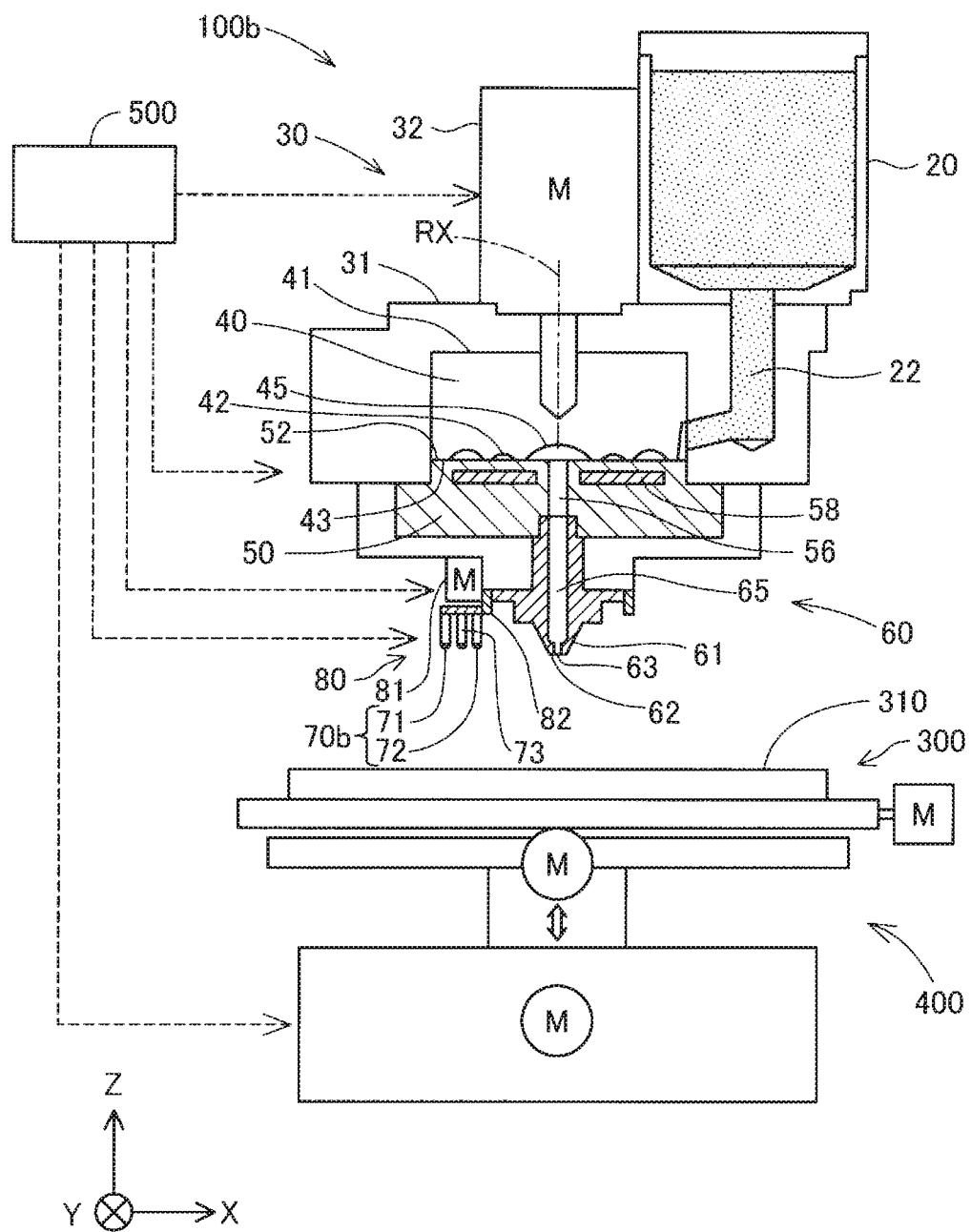
FIG. 9 is a diagram showing a schematic configuration of a discharge unit according to a second embodiment.

Acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins B. Second Embodiment FIG. 9 is a diagram showing a schematic configuration of a discharge unit 100b according to a second embodiment.

Since a configuration of the three-dimensional shaping device 10b other than the discharge unit 100b in the second embodiment is similar to that of the first embodiment, a description thereof is omitted. In addition, a portion not specifically described in the discharge unit 100b has similar configuration as that of the discharge unit 100 of the first embodiment.

The discharge unit 100b of the present embodiment includes a heating unit 70b and a measuring unit 73. The heating unit 70 of the first embodiment is implemented by one infrared heater, whereas the heating unit 70b includes a first heating unit 71 and a second heating unit 72. The first heating unit 71 and the second heating unit 72 are both infrared heaters. The measuring unit 73 is implemented by a radiation thermometer. When a radiation thermometer is used as the measuring unit 73 as in the present embodiment, it is preferable to measure the temperature by correcting a value detected by the radiation thermometer in accordance with emissivity of the shaping material used for shaping.

The heating unit 70b is supported by the support unit 83 of the rotation mechanism 80. The measuring unit 73 is also supported by the support unit 83. The above units are disposed in an order of the second heating unit 72, the measuring unit 73, and the first heating unit 71 based on being close to the nozzle 61. A position of each unit is changed by the rotation of the rotation mechanism 80, but a distance between the nozzle 61 and each unit is not changed.

Figure 10:
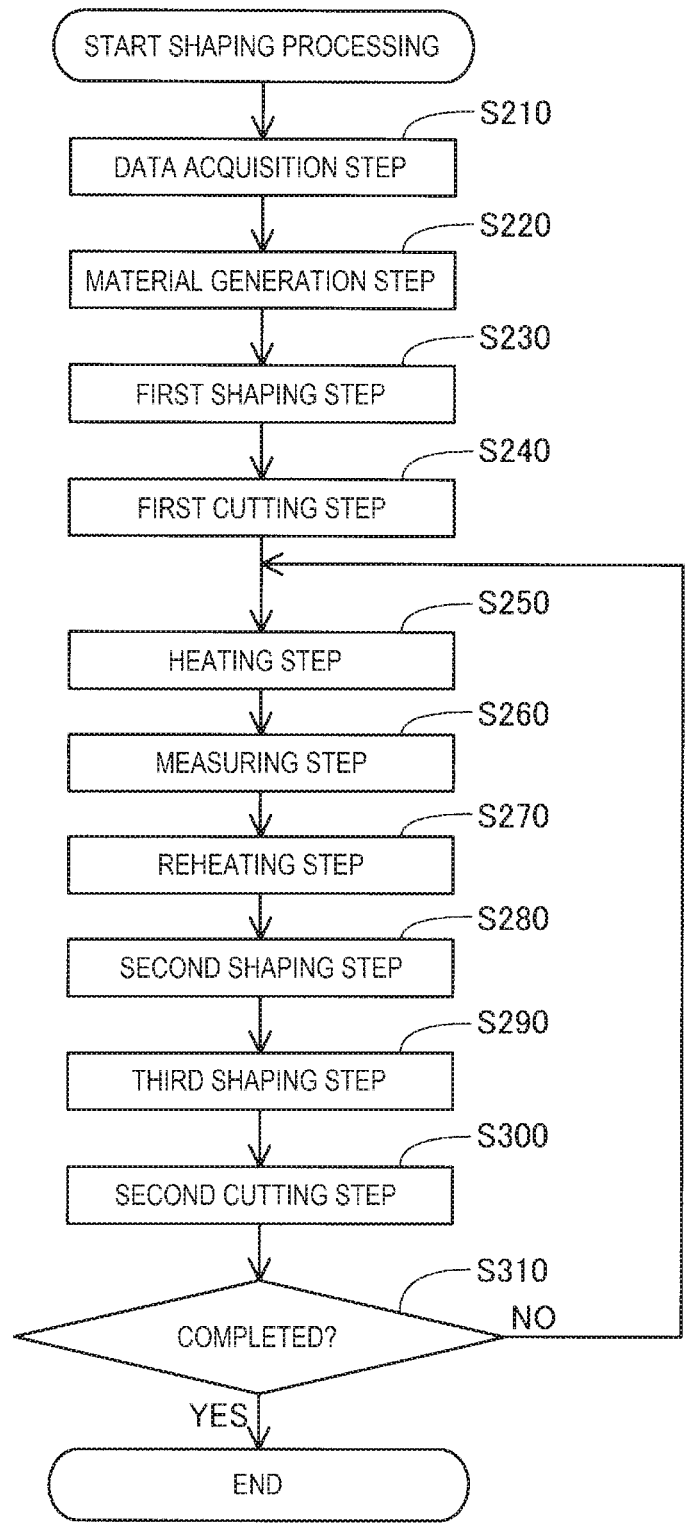
FIG. 10 is a process diagram of a shaping processing of a three-dimensional shaped object according to the second embodiment.

FIG. 10 is a process diagram of a shaping processing of the three-dimensional shaped object OB according to the second embodiment. Since steps S210 to S240 are similar to steps S110 to S140 of the shaping processing shown in FIG. 5, a description thereof is omitted.

In a heating step of step S250, the control unit 500 controls the rotation mechanism 80 to position the heating unit 70b in front of the nozzle 61 in the moving direction, and controls the first heating unit 71 to heat the first layer. When the heating unit 70b is positioned in front of the nozzle 61 in the moving direction, the measuring unit 73 is also positioned in front of the nozzle 61 in the moving direction.

In a measuring step of step S260, the control unit 500 controls the measuring unit 73 to measure a temperature of the portion of the first layer heated by the first heating unit 71 in step S250.

In a reheating step of step S270, the control unit 500 controls the second heating unit 72 to adjust the output of the second heating unit 72 based on the temperature measured in the measuring step of step S260, and heat the first layer by the second heating unit 72.

Steps S250 to S270 are also performed in parallel during shaping the second portion 810 in step S280. Thus, in a second shaping step of step S280, as the nozzle 61 moves, the first layer can be heated by the first heating unit 71, a temperature of the heated first layer can be measured by the measuring unit 73, the output of the second heating unit 72 can be adjusted based on the temperature measured by the measuring unit 73, and the first portion 800 can be reheated by the second heating unit 72. Since steps S290 to S310 are similar to steps S170 to S190 of the shaping processing shown in FIG. 5, a description thereof is omitted.

According to the method for manufacturing the three-dimensional shaped object OB of the second embodiment described above, the adhesion strength between the single layers constituting the first portion 800 and the adhesion strength between the first portion 800 and the second portion 810 can be increased without using the solvent, and the strength of the three-dimensional shaped object OB in the stacking direction can be increased. In particular, in the present embodiment, during shaping the three-dimensional shaped object OB, the heating of the first portion 800, the temperature measurement, and the output adjustment based on the measured temperature can be performed in parallel while moving the nozzle 61. Therefore, the second portion 810 can be shaped while maintaining a state in which the first portion 800 is heated to a temperature at which the adhesion strength between the first portion 800 and the second portion 810 is increased.

In the reheating step of step S270, the control unit 500 may control the first heating unit 71 instead of the second heating unit 72 to adjust output of the first heating unit 71 based on the temperature measured in the measuring step of step S260, and heat the first layer by the first heating unit 71. In this case, the heating unit 70b may include only the first heating unit 71 without including the second heating unit 72. Further, in this case, the measuring unit 73 may be disposed in front of the first heating unit 71 when viewed from the nozzle 61, or may be fixed to a position adjacent to the discharge portion 60.

C. Other Embodiments (C-1) In the above embodiments, the second collapsing amount is larger than the first collapsing amount. In contrast, the second collapsing amount may be the same as the first collapsing amount. In addition, the second collapsing amount may be smaller than the first collapsing amount.

(C-2) In the above embodiments, the first portion 800 is heated by the heating unit 70 positioned in front of the discharge portion 60 in the moving direction and moving together with the discharge portion 60 in the moving direction. In contrast, the first portion 800 may be heated by a heating unit positioned behind the discharge portion 60 in the moving direction. In addition, the heating unit may not move together with the discharge portion 60. For example, by changing an angle of warm air blower fixed to the stage 300, a blowing direction of warm air may be changed in accordance with the movement of the discharge portion 60. In addition, the entire first portion 800 may be heated instead of a part of the first portion 800.

(C-3) In the above embodiments, the three-dimensional shaped object OB is shaped, while satisfying Formula (1), that is, while maintaining a state where the shaping material discharged from the nozzle 61 does not protrude from the tip end surface 62 in the horizontal direction. In contrast, during shaping the three-dimensional shaped object OB, Formula (1) may not be satisfied. For example, the three-dimensional shaped object OB may be cut to a target dimension after the three-dimensional shaped object OB is created to be larger than the target dimension while the shaping material protrudes from the tip end surface 62.

D. Other Aspects

The present disclosure is not limited to the above-described embodiments, and can be implemented in various aspects without departing from the spirit of the present disclosure. For example, the present disclosure can be implemented by the following aspects. In order to solve some or all of the problems described in the present disclosure, or to achieve some or all of the effects of the present disclosure, technical features of the embodiments described above corresponding to technical features to be described below of the embodiments can be replaced or combined as appropriate. In addition, unless described as essential in this description, the technical features can be deleted as appropriate.

(1) According to a first aspect of the present disclosure, a method for manufacturing a three-dimensional shaped object is provided. The method for manufacturing a three-dimensional shaped object includes: a first step of forming a first portion of the three-dimensional shaped object by discharging a shaping material containing a resin from a discharge portion toward a stage or a previously formed layer and pressing the discharged shaping material against a tip end surface of the discharge portion; a heating step of heating the first portion to a temperature less than a glass transition temperature of the resin; and a second step of forming a second portion of the three-dimensional shaped object by discharging the shaping material from the discharge portion toward the first portion heated in the heating step and pressing the discharged shaping material against the tip end surface.

According to such an aspect, adhesion strength between single layers constituting the first portion and adhesion strength between the first portion and the second portion can be increased without using a solvent, and strength of the three-dimensional shaped object in a stacking direction can be increased.

(2) The method for manufacturing a three-dimensional shaped object according to the above aspect may further include a cutting step of cutting the first portion formed in the first step before the heating step. According to such an aspect, even when the second portion is shaped on the first portion after the first portion is cut, the adhesion strength between the first portion and the second portion can be increased.

(3) In the method for manufacturing a three-dimensional shaped object according to the above aspect, a degree of pressing the shaping material against the tip end surface in the second step may be larger than a degree of pressing the shaping material against the tip end surface in the first step. According to such an aspect, adhesion between the first portion and the second portion when shaping the second portion on the first portion is increased. Therefore, the adhesion strength between the first portion and the second portion can be increased.

(4) In the method for manufacturing a three-dimensional shaped object according to the above aspect, in the heating step, the first portion may be heated to a temperature of 80% or more of the glass transition temperature [° C.] and less than the glass transition temperature. According to such an aspect, the adhesion strength between the first portion and the second portion can be more effectively increased.

(5) In the method for manufacturing a three-dimensional shaped object according to the above aspect, in the heating step, the first portion may be heated by a heating unit positioned in front of the discharge portion in a moving direction and moving together with the discharge portion in the moving direction, and in the second step, the second portion may be formed on the first portion heated by the heating unit by the discharge portion positioned behind the heating unit in the moving direction. According to such an aspect, it is possible to prevent the influence of a thermal effect on the first portion other than the portion on which the second portion is formed, and to increase the strength of the three-dimensional shaped object.

(6) In the method for manufacturing a three-dimensional shaped object according to the above aspect, the heating step may include a measuring step of measuring a temperature of the first portion heated by the heating unit, such that output of the heating unit may be adjusted based on the temperature measured in the measuring step. According to such an aspect, the second portion can be shaped while maintaining a state in which the first portion is heated to a temperature at which the adhesion strength between the first portion and the second portion is increased.

(7) In the method for manufacturing a three-dimensional shaped object according to the above aspect, the heating unit may include a first heating unit and a second heating unit, the second heating unit and the first heating unit may be disposed in this order of being close to the discharge portion, and in the measuring step, a temperature of the first portion heated by the first heating unit may be measured, output of the second heating unit may be adjusted based on the temperature measured in the measuring step, and the first portion may be reheated by the second heating unit. According to such an aspect, during shaping the three-dimensional shaped object, the heating of the first portion, the temperature measurement, and the output adjustment based on the measured temperature can be performed in parallel while moving the nozzle. Therefore, the second portion can be shaped while maintaining a state in which the first portion is heated to a temperature at which the adhesion strength between the first portion and the second portion is increased.

(8) In the method for manufacturing a three-dimensional shaped object according to the above aspect, the three-dimensional shaped object is shaped with the following Formula (1) being satisfied.

$$(Sq \times Gp)/Vt > 1.0 \qquad (1)$$

in which Sq indicates an area of the tip end surface, Gp indicates a distance between the tip end surface and an upper surface of a region where the shaping material is discharged, and Vt indicates a volume of the shaping material discharged by the discharge portion for each unit movement amount.

According to such an aspect, the shaping material discharged from the nozzle during the shaping can be prevented from protruding from the tip end surface of the nozzle in the horizontal direction. Therefore, the shaping accuracy of the three-dimensional shaped object can be improved.

The present disclosure is not limited to the method for manufacturing a three-dimensional shaped object described above, but may be implemented in various aspects. For example, the present disclosure can be implemented in an aspect of a three-dimensional shaping device, a method for controlling a three-dimensional shaping device, a computer program for shaping the three-dimensional shaped object, and a non-transitory tangible recording medium in which the computer program is recorded.

What is claimed is:

1. A method for manufacturing a three-dimensional shaped object, comprising:
    forming a first portion of the three-dimensional shaped object by discharging a shaping material containing a resin from a discharge portion toward a stage or a previously formed layer and pressing the discharged shaping material against a tip end surface of the discharge portion;
    heating the first portion to a target temperature which is 80% or more of a glass transition temperature Tg of the resin and less than the glass transition temperature Tg of the resin with a heating unit, the heating unit comprising a first heating unit and second heating unit, wherein the first heating unit and the second heating unit are disposed such that a distance between the second heating unit and the discharge portion is less than a distance between the first heating unit and the discharge portion, measuring a temperature of the first portion heated by the heating unit and adjusting output of the heating unit based on the measured temperature;

forming a second portion of the three-dimensional shaped object by discharging the shaping material from the discharge portion toward the first portion heated to the target temperature and pressing the discharged shaping material against the tip end surface; wherein:

forming the first portion and forming the second portion are controlled so that shaping of the three-dimensional shaped object satisfies formula (1):

$$(Sq \times Gp)/Vt > 1.0 \tag{1}$$

in which a unit of (Sq×Gp) is the same as a unit of Vt, Sq indicates an area of the tip end surface, Gp indicates a distance between the tip end surface and an upper surface of a region where the shaping material is discharged, and Vt indicates a volume of the shaping material discharged by the discharge portion per unit movement amount of the discharge portion, heating the first portion to the target temperature with the heating unit comprises heating the first portion with the first heating unit, measuring the temperature of the first portion heated by the heating unit comprises measuring a temperature of the first portion heated by the first heating unit, and adjusting the output of the heating unit comprises adjusting output of the second heating unit based on the measured temperature; and reheating the first portion with the second heating unit.

2. The method for manufacturing a three-dimensional shaped object according to claim 1, further comprising:

cutting the first portion before heating the first portion.

3. The method for manufacturing a three-dimensional shaped object according to claim 1, wherein:

a degree of pressing the shaping material against the tip end surface in the step of forming the second portion is larger than a degree of pressing the shaping material against the tip end surface in the step of forming the first portion.

4. The method for manufacturing a three-dimensional shaped object according to claim 1, wherein the heating unit moves together with the discharge portion and the heating unit is positioned in front of the discharge portion in a direction of movement of the discharge portion when the first portion is heated by the heating unit, and the discharge portion is positioned behind the heating unit in the direction of movement of the discharge portion when the second portion is formed on the first portion heated by the heating unit.

* * * * *